(12) United States Patent
Jeong et al.

(10) Patent No.: US 10,859,863 B2
(45) Date of Patent: Dec. 8, 2020

(54) LIQUID CRYSTAL DISPLAY DEVICE

(71) Applicant: Samsung Display Co., Ltd., Yongin-si (KR)

(72) Inventors: Youn Hak Jeong, Cheonan-si (KR); Yun Seok Lee, Seoul (KR)

(73) Assignee: Samsung Display Co., Ltd.

( * ) Notice: Subject to any disclaimer, the term of this patent is extended or adjusted under 35 U.S.C. 154(b) by 9 days.

(21) Appl. No.: 15/918,918

(22) Filed: Mar. 12, 2018

(65) Prior Publication Data

US 2019/0041675 A1 Feb. 7, 2019

(30) Foreign Application Priority Data

Aug. 2, 2017 (KR) .................. 10-2017-0098140

(51) Int. Cl.
*G02F 1/1333* (2006.01)
*G02F 1/1343* (2006.01)
(Continued)

(52) U.S. Cl.
CPC ...... *G02F 1/133345* (2013.01); *G02F 1/0107* (2013.01); *G02F 1/1343* (2013.01);
(Continued)

(58) Field of Classification Search
CPC .......... G02F 1/1343; G02F 1/133345; G02F 1/0107; G02F 1/13306; G02F 2001/134345; G02F 1/134309; G02F 1/13439; G02F 1/136286; G02F 1/155; G02F 1/1393; G02F 1/1395; G02F 1/136; G02F 1/218; G02F 1/134363; G02F 1/134327; G02F 1/133707; G02F 1/134336; G02F 1/0316; G02F 2001/134318; G02F 2001/134372; G02F 2001/134381; G02F 2001/1357;
(Continued)

(56) References Cited

U.S. PATENT DOCUMENTS

2004/0070714 A1* 4/2004 Ishii .................. G02F 1/133555 349/129
2005/0078243 A1* 4/2005 Higa .................. G02F 1/133555 349/114

(Continued)

FOREIGN PATENT DOCUMENTS

| KR | 10-2006-0058964 A | 6/2006 |
| KR | 10-2012-0021537 A | 3/2012 |
| KR | 10-2016-0118438 A | 10/2016 |
| KR | 10-2017-0001847 A | 1/2017 |

*Primary Examiner* — Shan Liu
(74) *Attorney, Agent, or Firm* — Innovation Counsel LLP

(57) ABSTRACT

A liquid crystal display includes a substrate, a pixel electrode disposed on the substrate and including a first subpixel electrode and a second subpixel electrode, and a liquid crystal layer disposed on the first subpixel electrode and the second subpixel electrode. A first insulating layer is disposed between the substrate and the first subpixel electrode. A second insulating layer is disposed between the second subpixel electrode and the liquid crystal layer. A common electrode is disposed on the liquid crystal layer. The first subpixel electrode is disposed farther from the substrate than the second subpixel electrode, and the first subpixel electrode and the second subpixel electrode have facing edges which are connected with each other.

18 Claims, 15 Drawing Sheets

(51) Int. Cl.
*G02F 1/133* (2006.01)
*G02F 1/01* (2006.01)

(52) U.S. Cl.
CPC .................. *G02F 1/13306* (2013.01); *G02F 2001/134345* (2013.01)

(58) Field of Classification Search
CPC ........ G02F 2001/136218; G02F 2001/136295; G02F 2001/1552; G02F 2001/1555; G02F 2001/1557; G02F 2001/13629; G02F 2201/12; G02F 2201/121; G02F 2201/124; G02F 2201/122; G02F 2201/123; G02F 2201/14; G02F 2202/10; G02F 1/133753; G02F 1/3775; G02F 1/1362; G02F 1/136209; G02F 1/136227; G02F 1/1365; G02F 1/1368; G02F 2001/136222; G02F 2001/136231; G02F 2001/13625; G02F 2001/1635; H01L 27/124; H01L 27/3276; H01L 27/3297; H01L 27/3279; H01L 27/329; H01L 23/49534; H01L 2933/0016; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508; G09G 2300/0421; G09G 2300/0426; G09G 2300/0439; G09G 3/3659
USPC .............................. 349/139–148, 129, 42–43
See application file for complete search history.

(56) References Cited

U.S. PATENT DOCUMENTS

| | | | |
|---|---|---|---|
| 2007/0247580 A1* | 10/2007 | Okumura | G02F 1/133555 349/139 |
| 2008/0204649 A1* | 8/2008 | Yoshida | G02F 1/134336 349/141 |
| 2009/0059110 A1* | 3/2009 | Sasaki | G02F 1/133514 349/39 |
| 2009/0096978 A1* | 4/2009 | Kim | G02F 1/134309 349/144 |
| 2010/0045915 A1* | 2/2010 | No | G02F 1/133514 349/138 |
| 2011/0085102 A1* | 4/2011 | Kim | G02F 1/133707 349/42 |
| 2012/0281173 A1* | 11/2012 | Kwon | G02F 1/133707 349/123 |
| 2014/0049717 A1* | 2/2014 | Kwak | G02F 1/133512 349/43 |
| 2014/0132865 A1* | 5/2014 | Hiratsuka | G02F 1/134363 349/33 |
| 2014/0211142 A1* | 7/2014 | Kim | G02F 1/13624 349/138 |
| 2015/0355509 A1* | 12/2015 | Chai | G02F 1/133345 349/43 |
| 2016/0033816 A1* | 2/2016 | Yoon | G02F 1/133512 349/108 |
| 2016/0042705 A1* | 2/2016 | Chen | G02F 1/133707 345/694 |
| 2016/0377932 A1* | 12/2016 | Kim | G02F 1/134309 349/43 |

* cited by examiner

LIQUID CRYSTAL DISPLAY DEVICE

CROSS-REFERENCE TO RELATED APPLICATION

This application claims priority to and the benefit of Korean Patent Application No. 10-2017-0098140 filed in the Korean Intellectual Property Office on Aug. 2, 2017, the entire contents of which are incorporated herein by reference.

BACKGROUND

(a) Technical Field

This disclosure relates to a liquid crystal display.

(b) Description of the Related Art

A liquid crystal display (LCD) includes two display panels on which field generating electrodes such as a pixel electrode and a common electrode are formed, and a liquid crystal layer interposed between the two display panels. The liquid crystal display displays an image by generating an electric field on a liquid crystal layer by applying a voltage to the field generating electrodes, thereby determining alignment directions of liquid crystal molecules of the liquid crystal layer using the generated field, and controlling polarization of incident light.

Among liquid crystal displays, there is a liquid crystal display of a vertically aligned mode in which long axes of liquid crystal molecules are arranged so as to be perpendicular to upper and lower plates in a state in which no electric field is applied. The liquid crystal display of the vertically aligned mode is spotlighted because of its high contrast ratio and wide reference viewing angle.

In the liquid crystal display of the vertically aligned mode, a technique by which one pixel is divided into a plurality of subpixels such that different voltages are applied to the respective subpixels is used. The application of different voltages requires formation of a plurality of switching elements and leads to a complex structure. Particularly, an aperture ratio and transmittance may be deteriorated as a resolution is higher.

The above information disclosed in this Background section is only for enhancement of understanding of the background and therefore it may contain information that does not form the prior art that is already known in this country to a person of ordinary skill in the art.

SUMMARY

Exemplary embodiments provide a liquid crystal display capable of improving side visibility.

An exemplary embodiment provides a liquid crystal display including a substrate, a pixel electrode disposed on the substrate and including a first subpixel electrode and a second subpixel electrode, and a liquid crystal layer disposed on the first subpixel electrode and the second subpixel electrode. A first insulating layer is disposed between the substrate and the first subpixel electrode. A second insulating layer is disposed between the second subpixel electrode and the liquid crystal layer. A common electrode is disposed on the liquid crystal layer, wherein a distance between the first subpixel electrode and the common electrode is smaller than a distance between the second subpixel electrode and the common electrode.

The first subpixel electrode and the second subpixel electrode are integral, and may be disposed at a same layer.

The first subpixel electrode and the second subpixel electrode may not overlap each other.

The first subpixel electrode and the second subpixel electrode may have facing end portions which are connected with each other.

The first subpixel electrode and the second subpixel electrode may be connected with a connector integral therewith.

The connector may extend along a side surface of the first insulating layer.

The first insulating layer and the second insulating layer may be different materials.

The liquid crystal display may further include a column spacer disposed on the first insulating layer, and the second insulating layer may be a same material as that of the column spacer.

A cell gap of a liquid crystal layer overlapping the second subpixel electrode may be 0.85 to 1.15 times a cell gap of a liquid crystal layer overlapping the first subpixel electrode.

A thickness of the second insulating layer may be about 0.5 µm or more.

The second insulating layer may include a protrusion that overlap the first insulating layer and protrudes toward the liquid crystal layer.

An exemplary embodiment provides a liquid crystal display including a substrate, a pixel electrode disposed on the substrate and including a first subpixel electrode and a second subpixel electrode, and a liquid crystal layer disposed on the first subpixel electrode and the second subpixel electrode. A first insulating layer is disposed between the substrate and the first subpixel electrode. A second insulating layer is disposed between the second subpixel electrode and the liquid crystal layer. A common electrode is disposed on the liquid crystal layer, wherein the first subpixel electrode is disposed farther from the substrate than the second subpixel electrode, and the first subpixel electrode and the second subpixel electrode have facing edges which are connected with each other.

The first subpixel electrode and the second subpixel electrode may be connected with a connector integral therewith.

The connector may extend along a side surface of the first insulating layer.

Each of the first subpixel electrode and the second subpixel electrode may include a horizontal stem, a vertical stem that crosses the horizontal stem, and branches that extend from the horizontal stem and vertical stem in a diagonal direction, and the connector may be connected with the vertical stem of the first subpixel electrode and the vertical stem of the second subpixel electrode.

Each of the first subpixel electrode and the second subpixel electrode may include an outer stem disposed in at least one edge thereof.

The outer stem may not be disposed in at least one of facing edges of the first subpixel electrode and the second subpixel electrode.

The second insulating layer may include an overlapping portion that overlaps the first insulating layer and a non-overlapping portion that does not overlap the first insulating layer, and the overlapping portion of the second insulating layer may protrude more toward the liquid crystal layer than the non-overlapping portion.

The protrusion may overlap the connector.

The liquid crystal display may further include a transistor disposed between the substrate and the pixel electrode, the first subpixel electrode may be directly connected with the transistor by an extension, and the second subpixel electrode may be electrically connected to the transistor through the first subpixel electrode.

The first insulating layer may be continuously positioned over a plurality of first subpixel electrodes in a first direction, and the second insulating layer may be continuously positioned over a plurality of second subpixel electrodes in the first direction.

The first insulating layer and the second insulating layer may be alternately disposed in a second direction that crosses the first direction.

An edge of the first insulating layer may overlap an edge of the second insulating layer.

According to the exemplary embodiments, it is possible to provide a liquid crystal display with improved side visibility without deteriorating an aperture ratio and transmittance.

DETAILED DESCRIPTION OF THE EMBODIMENTS

Figure 1:
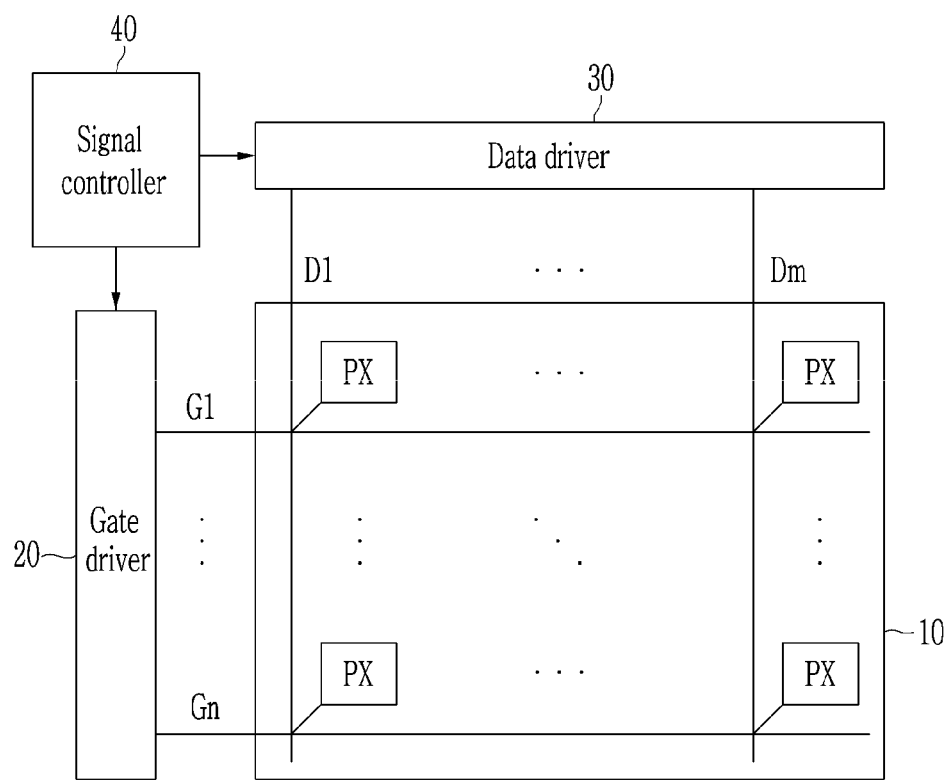
FIG. 1 is a layout view illustrating a liquid crystal display according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

To clearly describe the embodiments, parts that are irrelevant to the description are omitted, and like numerals refer to like or similar constituent elements throughout the specification.

Since sizes and thicknesses of constituent members shown in the accompanying drawings are arbitrarily given for better understanding and ease of description, the embodiments are not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-section" means when a cross-section taken by vertically cutting an object portion is viewed from the side.

First, a liquid crystal display according to an exemplary embodiment will be described with reference to FIG. 1 and FIG. 2.

Figure 2:
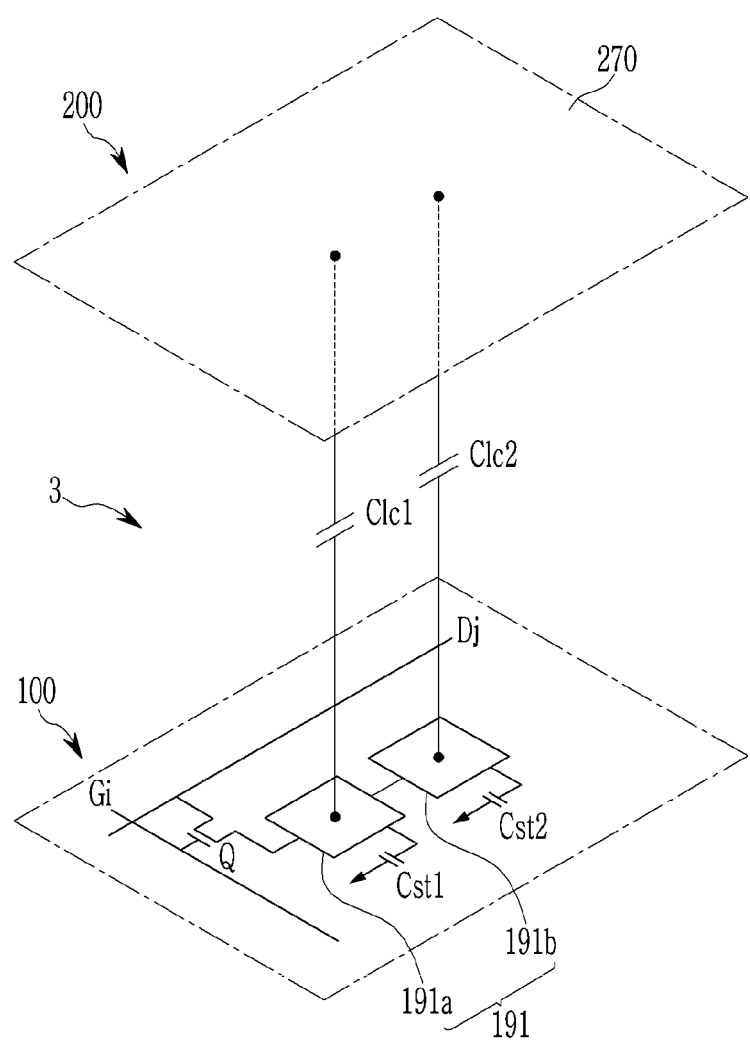
FIG. 2 is an equivalent circuit diagram illustrating one pixel of a liquid crystal display according to an exemplary embodiment.

FIG. 1 is a layout view illustrating a liquid crystal display, sometimes called a display device, according to an exemplary embodiment, and FIG. 2 is an equivalent circuit diagram illustrating one pixel of a liquid crystal display according to an exemplary embodiment.

Referring to FIG. 1, the display device according to the present exemplary embodiment includes a display panel 10, a gate driver 20, a data driver 30, and a signal controller 40.

The display panel 10 includes gate lines G1-Gn and data lines D1-Dm, and the gate lines G1-Gn and data lines D1-Dm are connected to pixels PX that are arranged in a substantially matrix form. The gate lines G1-Gn may extend in a first direction (e.g., a row direction), and the data lines D1-Dm may extend in a second direction (e.g., a column direction) that crosses the first direction. Each pixel PX may receive gate signals including a gate-on voltage for turning on a transistor as a switching element and a gate-off voltage for turning off the transistor as the switching element through the gate lines G1-Gn, and a data voltage corresponding to an image signal may be applied through the data lines D1-Dm when the transistor is turned on. One pixel PX, which is a unit for displaying an image, may uniquely display one of primary colors, or a plurality of pixels may alternately display the primary colors according to time, to display desired colors by a spatial or temporal sum of the primary colors.

The signal controller 40 controls the gate driver 20 and the data driver 30. The signal controller 40 receives an image signal and control signals thereof from an external graphics processor (not illustrated). For example, the control signals include a horizontal synchronizing signal, a vertical synchronization signal, a clock signal, a data enable signal, and the like. The signal controller 40 processes the image signal based on the control signals to be appropriate for an operating condition of the display panel 10, and then generates and outputs image data, a gate control signal, a data control signal, and clock signals.

The gate driver 20 receives a gate control signal from the signal controller 40 to generate a gate signal including a gate-on voltage and a gate-off voltage and applies it to the gate lines G1-Gn.

The data driver 30 receives a data control signal and image data from the signal controller 40, converts the image data to a data signal (data voltage) by using a gray voltage generated in a gray voltage generator (not illustrated), and applies the data signal to the data lines D1-Dm.

Referring to FIG. 2, the display panel 10 includes a first display panel 100 and a second display panel 200 which face each other, and a liquid crystal layer 3 disposed therebetween.

Each pixel PX, e.g., a pixel PX connected with an $i^{th}$ gate line Gi and a $j^{th}$ data line Dj, includes a transistor Q connected with the gate line Gi and the data line Dj, first and second liquid crystal capacitors Clc1 and Clc2 connected with the transistor Q, and first and second storage capacitors Cst1 and Cst2. The first and second storage capacitors Cst1 and Cst2 may be omitted. Each pixel PX includes a pixel electrode 191 including a first subpixel electrode 191a and a second subpixel electrode 191b connected with each other. Unlike in the illustrated exemplary embodiment, one pixel PX may include 3 or more subpixel electrodes and 3 or more liquid crystal capacitors.

The transistor Q positioned in the first display panel 100 includes a control terminal connected with the gate line Gi, an input terminal connected with the data line Dj, and an output terminal connected with the first liquid crystal capacitor Clc1 and the first storage capacitor Cst1.

The first liquid crystal capacitor Clc1 uses the first subpixel electrode 191a of the first display panel 100 and a common electrode 270 of the second display panel 200 as two terminals, and the liquid crystal layer 3 disposed between the first subpixel electrode 191a and the common electrode 270 serves as a dielectric material. The first subpixel electrode 191a is connected with the transistor Q and the common electrode 270 is formed on an entire surface of the second display panel 200 to receive the common voltage.

The second liquid crystal capacitor Clc2 uses the second subpixel electrode 191b of the first display panel 100 and the common electrode 270 of the second display panel 200 as two terminals, and the liquid crystal layer 3 disposed between the second subpixel electrode 191b and the common electrode 270 serves as a dielectric material. The second subpixel electrode 191b is connected with the first subpixel electrode 191a. Accordingly, the second subpixel electrode 191b may receive a data voltage through the first subpixel electrode 191a connected with the transistor Q, and the data voltage applied to the second subpixel electrode 191b may be the same as the data voltage applied to the first subpixel electrode 191a.

However, an intensity of an electric field generated in the liquid crystal layer 3 of the first liquid crystal capacitor Clc1 may be different from an intensity of an electric field generated in the liquid crystal layer 3 of the second liquid crystal capacitor Clc2 by structural features related to the first subpixel electrode 191a and the second subpixel electrode 191b. In other words, although the first subpixel electrode 191a and the second subpixel electrode 191b receive a same voltage, a charging voltage of the first liquid crystal capacitor Clc1 may be different from that of the second liquid crystal capacitor Clc2. As a result, one pixel PX may include a first subpixel formed by the first liquid crystal capacitor Clc1 and a second subpixel formed by the second liquid crystal capacitor Clc2, in which the arrangement of the liquid crystal molecules in the liquid crystal layer 3 are differently controlled, to improve the side visibility of the liquid crystal display. This will be described in detail later.

The first storage capacitor Cst1 which performs an auxiliary function of the first liquid crystal capacitor Clc1 is formed by using a storage electrode line (not illustrated) positioned in the first display panel 100 and the first subpixel electrode 191a which overlap each other with an insulator therebetween. The second storage capacitor Cst2 which performs an auxiliary function of the second liquid crystal capacitor Clc2 is formed by using the storage electrode line and the second subpixel electrode 191b which overlap each other with an insulator therebetween. A predetermined voltage such as a common voltage may be applied to the storage electrode line.

An overall configuration of the liquid crystal display according to the exemplary embodiment has been described so far. Hereinafter, the liquid crystal display according to an exemplary embodiment will be described in detail based on one pixel.

Figure 3:
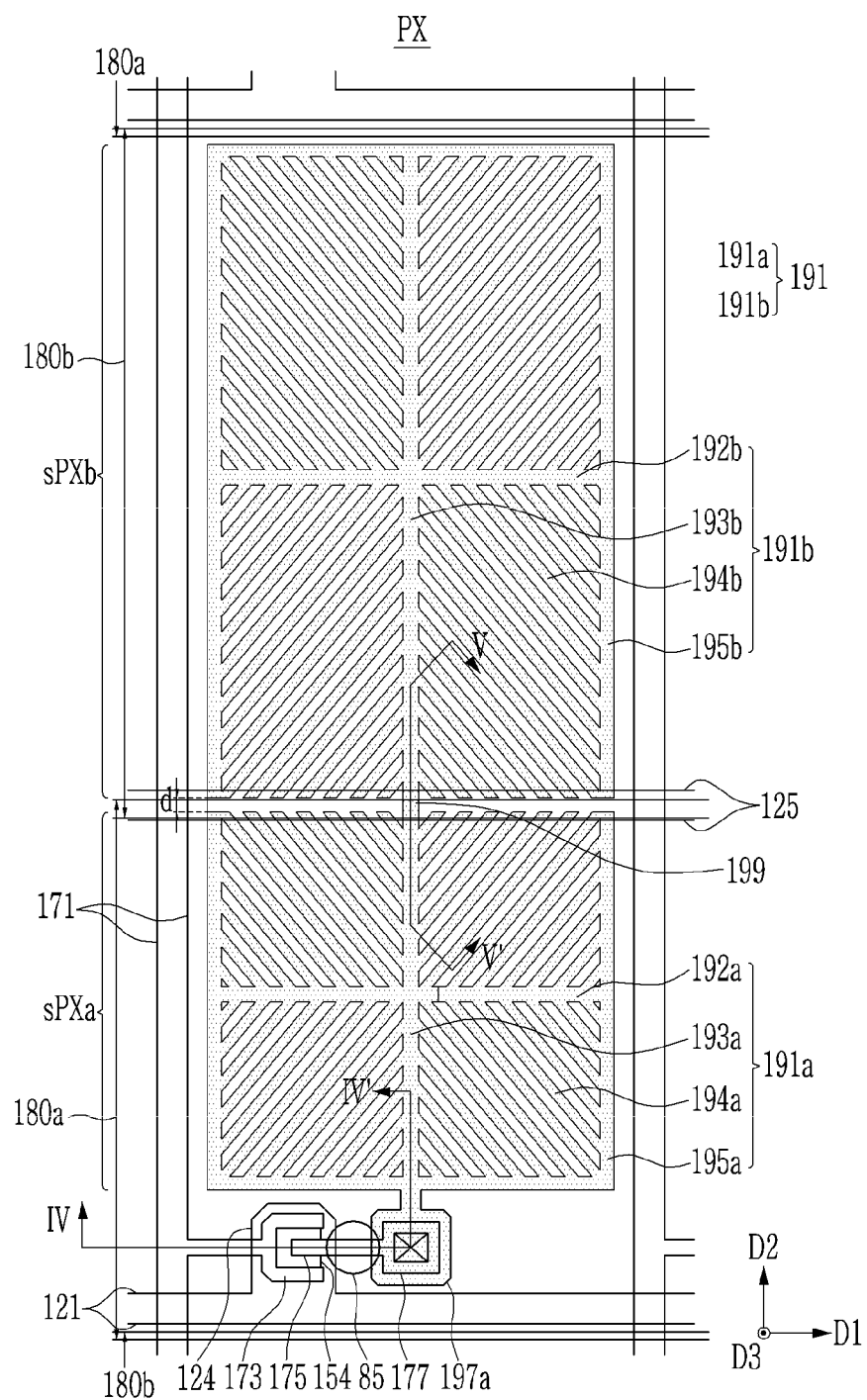
FIG. 3 is a top plan view illustrating one pixel of a liquid crystal display according to an exemplary embodiment.
Figure 4:
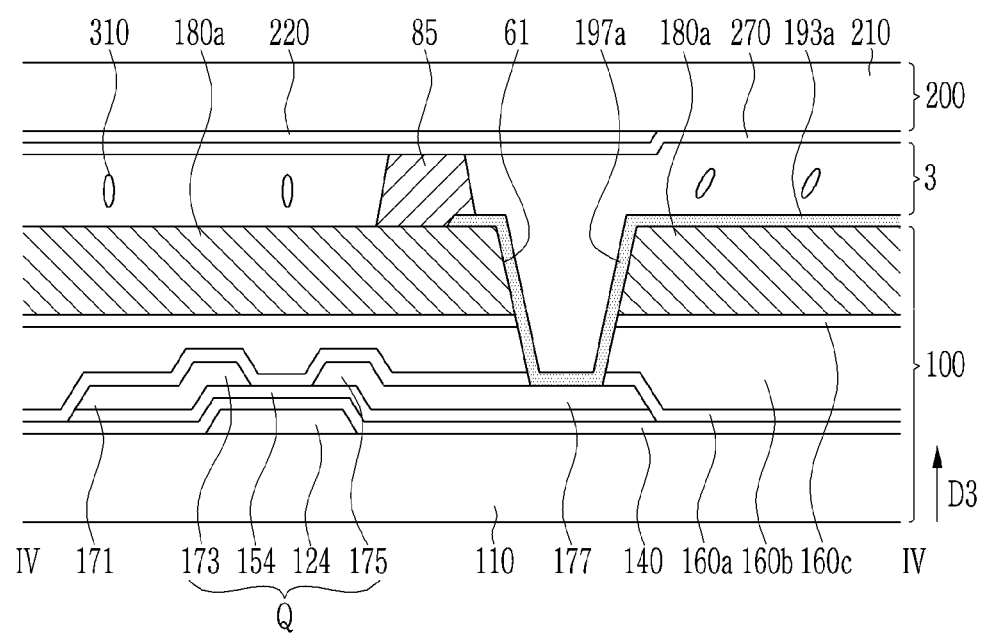
FIG. 4 is a cross-sectional view taken along a line IV-IV' of FIG. 3.
Figure 5:
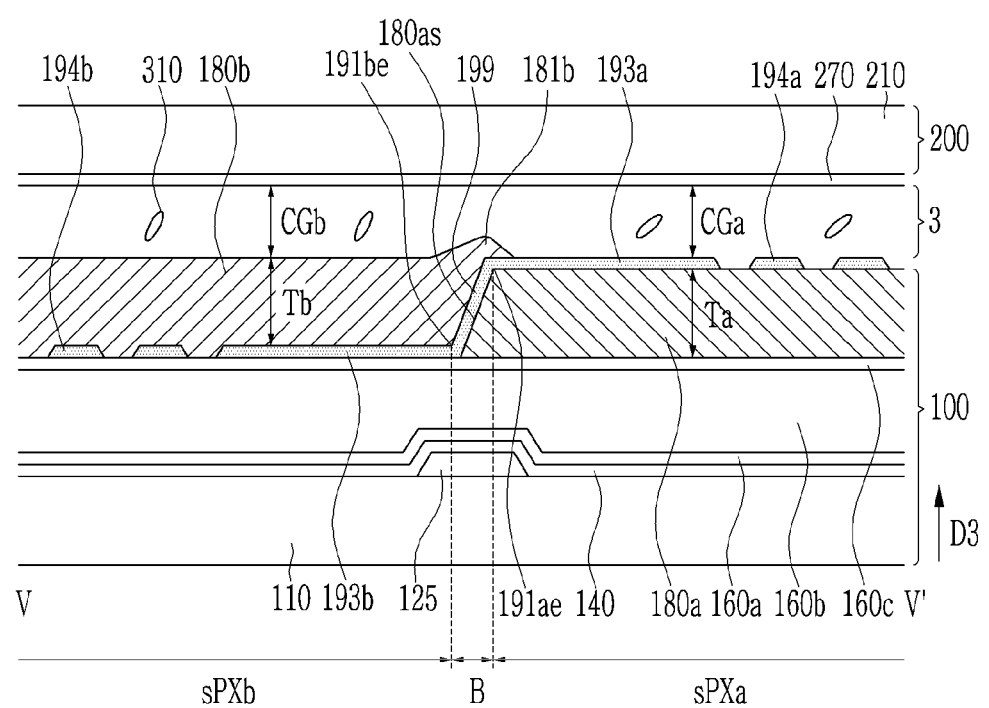
FIG. 5 is a cross-sectional view taken along a line V-V' of FIG. 3.

FIG. 3 is a top plan view illustrating one pixel PX of a liquid crystal display according to an exemplary embodiment, FIG. 4 is a cross-sectional view taken along a line IV-IV' of FIG. 3, and FIG. 5 is a cross-sectional view taken along a line V-V' of FIG. 3.

The top plan view of FIG. 3 illustrates one pixel PX of the liquid crystal display according to the exemplary embodiment and portions of the gate lines and gate lines connected with pixels adjacent thereto. Although one pixel PX is described as an example, such pixels PX may be arranged in a matrix form, i.e., in the first direction and in the second direction in the liquid crystal display.

Referring to FIG. 3, FIG. 4, and FIG. 5, the liquid crystal display according to the present exemplary embodiment includes the first display panel 100 and the second display panel 200 which face each other, and the liquid crystal layer 3 disposed therebetween.

The first display panel 100 will be described. A gate conductor including a gate line 121, a gate electrode 124, and a storage electrode line 125 is disposed on a first substrate 110 formed of a transparent insulating material such as glass.

The gate line 121 extends mainly in a horizontal direction to transfer a gate signal (scan signal). Unlike in the illustrated exemplary embodiment, the gate line 121 may extend mainly in a vertical direction. The gate electrode 124 is formed integrally with the gate line 121 and protrudes from the gate line 121. In the present specification, when a first element is integrally formed or integral with a second element, this indicates that the first element and the second element are formed by using a same material and a same process, and are connected with each other, i.e., are a single piece and not a plurality of separate pieces connected together. The storage electrode line 125 extends mainly in the horizontal direction to transfer a predetermined voltage such as a common voltage. For example, the storage electrode line 125 may extend to pass between the first subpixel electrode 191a and the second subpixel electrode 191b. Although not illustrated, the storage electrode line 125 may include a portion that extends substantially in parallel with a data line 171, and a shape and a disposal of the storage electrode line 125 may be variously modified. The gate conductor may include a metal such as copper (Cu), molybdenum (Mo), aluminum (Al), silver (Ag), chromium (Cr), tantalum (Ta), and titanium (Ti), or a metal alloy thereof, and may be formed as a single layer or multiple layers.

A gate insulating layer 140 may be disposed on the gate conductor. The gate insulating layer 140 may include an inorganic insulating material such as a silicon oxide and a silicon nitride.

A semiconductor layer 154 is disposed on the gate insulating layer 140. The semiconductor layer 154 may include a semiconductor material such as an oxide semiconductor, amorphous silicon, and polycrystalline silicon.

A data conductor including the data line 171, a source electrode 173, and a drain electrode 175 is disposed on the semiconductor layer 154. The data line 171 may extend mainly in the vertical direction, but may extend mainly in the horizontal direction. The source electrode 173 is integrally formed with the data line 171, and protrudes from the data line 171. Further, a portion of the data line 171 may serve as the source electrode 173, unlike the illustrated exemplary embodiment. The drain electrode 175 may be separated from the source electrode 173 at a predetermined interval, and may include an extension 177. The data conductor may include a metal such as aluminum (Al), copper (Cu), silver (Ag), gold (Au), platinum (Pt), palladium (Pd), nickel (Ni), molybdenum (Mo), tungsten (W), titanium (Ti), chromium (Cr), and tantalum (Ta), or a metal alloy thereof, and may be formed as a single layer or multiple layers. Although not illustrated, an ohmic contact layer may be disposed between the semiconductor layer 154 and the data conductor.

The gate electrode 124, the source electrode 173, and the drain electrode 175 constitute the transistor Q together with the semiconductor layer 154. A channel of the transistor Q may be formed at a portion of the semiconductor layer 154 between the source electrode 173 and the drain electrode 175.

A first passivation layer 160a, a second passivation layer 160b, and a third passivation layer 160c may be disposed on the data conductor. One or two of the first passivation layer 160a, the second passivation layer 160b, and the third passivation layer 160c may be omitted.

The first passivation layer 160a may include an inorganic insulating material, and the second passivation layer 160b may include an organic insulating material, but the present specification is not limited thereto. The second passivation layer 160b may be a color filter. When being the color filter, the second passivation layer 160b may uniquely display one of primary colors. For example, the primary colors may include red, green, and blue, or yellow, cyan, magenta. The color filter may also display mixed colors of white or primary colors. The color filter may be disposed in the second display panel 200. The third passivation layer 160c may include an inorganic insulating material or an organic insulating material. The third passivation layer 160c may prevent the color filter from being lifted and suppress contamination of the liquid crystal layer 3 due to an organic material such as a solvent having flowed from the color filter.

A first insulating layer 180a is disposed on the third passivation layer 160c. The first insulating layer 180a may include an organic insulating material, and may include a photosensitive material such as a photoresist. The first insulating layer 180a may be disposed in a region where the first subpixel electrode 191a is formed, but may not be disposed in a region where the second subpixel electrode 191b is formed. The first insulating layer 180a may be continuously positioned over the adjacent pixels PX in the first direction D1. The first insulating layer 180a may be formed by, e.g., forming an insulating layer on the third passivation layer 160c and patterning it through a photolithography process. At this time, an insulating layer that overlaps the second subpixel electrode 191b is removed. When a halftone mask is used in the photolithography process, a contact hole 61 that overlaps the extension 177 of the drain electrode 175 may be formed together in the first insulating layer 180a and the first to third passivation layers 160a, 160b, and 160c while the first insulating layer 180a is formed.

The pixel electrode 191 including the first subpixel electrode 191a and the second subpixel electrode 191b is disposed on the first insulating layer 180a. One pixel PX includes a first subpixel sPXa corresponding to the first subpixel electrode 191a and a second subpixel sPXb corresponding to the second subpixel electrode 191b. The first subpixel electrode 191a is disposed to overlap the first insulating layer 180a, but the second subpixel electrode 191b is disposed to not overlap the first insulating layer 180a. Accordingly, the first subpixel electrode 191a is substantially positioned farther away from the second subpixel electrode 191b by a thickness Ta of the first insulating layer 180a based on the first substrate 110 and in a direction D3. The first subpixel electrode 191a and the second subpixel electrode 191b may have a substantially rectangular shape, may be separated from each other at a predetermined interval, and may have facing edges 191ae and 191be which are connected with each other by a connector 199. A distance d between the first subpixel electrode 191a and the second subpixel electrode 191b, which corresponds to a boundary B therebetween, may be designed in consideration of controllability of an alignment direction of liquid crystal (hereinafter simply referred to as liquid crystal controllability) and transmittance. As the distance d is narrower, the transmittance may be increased. However, as the distance d is wider, the liquid crystal controllability may be more appropriate at the boundary B between the first subpixel electrode 191a and the second subpixel electrode 191b. For example, the distance d may be range of about 3 to 11 μm, or 5 to 9 μm, but it is not limited thereto. The distance d may be less than about 3 μm or more than about 11 μm.

The connector 199 may connect the first subpixel electrode 191a with the second subpixel electrode 191b in a region that overlaps a substantially vertically central line of the first subpixel electrode 191a and the second subpixel electrode 191b. In the illustrated exemplary embodiment, the connector 199 is connected with the vertical stem 193a of the first subpixel electrode 191a and the vertical stem 193b of the second subpixel electrode 191b. However, the connector 199 may connect the first subpixel electrode 191a and the second subpixel electrode 191b in a different region from that of the illustrated exemplary embodiment. For example, the connector 199 may be formed to connect a left edge and/or a right edge of the first subpixel electrode 191a and the second subpixel electrode 191b, and may be formed to entirely connect facing edges 191ae and 191be of the first subpixel electrode 191a and the second subpixel electrode 191b.

Referring to FIG. 5, the connector 199 is formed to be inclined along a side surface 180as of the first insulating layer 180a facing the second subpixel electrode 191b. The second subpixel electrode 191b and the first subpixel electrode 191a which are disposed at different heights are electrically connected to each other.

The first subpixel electrode 191a includes an extension 197a that extends from an edge opposite to an edge connected with the connector 199. The extension 197a of the first subpixel electrode 191a is connected with the extension 177 of the drain electrode 175 through the contact hole 61 formed the first insulating layer 180a and the first to third passivation layers 160a, 160b, and 160c. A lower surface of the extension 197a of the first subpixel electrode 191a contacts an upper surface of the extension 177 of the drain electrode 175, and thus the first subpixel electrode 191a is directly connected with the transistor Q.

Unlike the first subpixel electrode 191a, the second subpixel electrode 191b is not directly connected with the transistor Q. However, since the second subpixel electrode 191b is connected with to the first subpixel electrode 191a by the connector 199, the connector 199 is electrically connected to the transistor Q through the first subpixel electrode 191a. Accordingly, a data voltage applied to the first subpixel electrode 191a through the transistor Q may also be identically applied to the second subpixel electrode 191b.

The first subpixel electrode 191a, the second subpixel electrode 191b, the extension 197a, and the connector 199 may be formed by forming a conductive layer on the third passivation layer 160*c* and the first insulating layer 180*a* with a transparent conductive material such as an indium tin oxide (ITO) and an indium zinc oxide (IZO), and then patterning it through a photolithography process. Accordingly, the first subpixel electrode 191*a*, the second subpixel electrode 191*b*, the extension 197*a*, and the connector 199 are integrally formed, and are disposed as a same layer In addition, the first subpixel electrode 191*a*, the second subpixel electrode 191*b*, the extension 197*a*, and the connector 199 do not overlap each other.

In the illustrated exemplary embodiment, the pixel electrode 191 is connected with the transistor Q positioned therebelow in the top plan view. Particularly, the first subpixel electrode 191*a* is directly connected with the transistor Q. However, the connection between the pixel electrode 191 and the transistor Q may be variously modified without being limited thereto. For example, the pixel electrode 191 may be connected with the transistor Q positioned thereabove in the top plan view, and the second subpixel electrode 191*b* may be directly connected with the transistor Q.

An exemplary structure of the first subpixel electrode 191*a* and the second subpixel electrode 191*b*, particularly a planar structure illustrated in FIG. 3, will be described in detail. The first subpixel electrode 191*a* may include a cross-shaped stem including a horizontal stem 192*a* and the vertical stem 193*a* that crosses the horizontal stem 192*a*. In addition, the first subpixel electrode 191*a* may include branches 194*a* that extend in a diagonal direction from the horizontal stem 192*a* or the vertical stem 193*a*. The first subpixel electrode 191*a* may be divided into four subregions by the cross-shaped stem, and the branches 194*a* may be positioned in each of the subregions. When an electric field is generated, directions in which liquid crystal molecules 310 of the liquid crystal layer 3 are inclined in the four subregions may be differently controlled, thereby realizing a wide viewing angle.

The first subpixel electrode 191*a* may further include an outer stem 195*a* that surrounds at least one edge thereof. The first subpixel electrode 191*a* may have such a shape that end portions of the branches 194*a* are connected with each other by the outer stem 195*a*. An effective area of the first subpixel electrode 191*a* (an area in which the first subpixel electrode 191*a* is actually formed) may increase by the outer stem 195*a*, thereby increasing the transmittance of the liquid crystal display. The outer stem 195*a* may serve to prevent liquid crystal control from being stably performed at end portions of the branches 194*a* by a field generated in the data line 171 adjacent to the end portions of the branches 194*a*. In the illustrated exemplary embodiment, the outer stem 195*a* of the first subpixel electrode 191*a* is formed by the left, right, and lower edges, but is not formed at an upper edge that faces the second subpixel electrode 191*b*.

The second subpixel electrode 191*b* may include a horizontal stem 192*b*, the vertical stem 193*b*, and branches 194*b* which respectively correspond to the horizontal stem 192*a*, the vertical stem 193*a*, and the branches 194*a* of the first subpixel electrode 191*a*. The second subpixel electrode 191*b* may further include an outer stem 195*b* that surrounds at least one edge thereof. Functions of the horizontal stem 192*b*, the vertical stem 193*b*, the branches 194*b*, and the outer stem 195*b* of the first subpixel electrode 191*b* are as described above in relation to the first subpixel electrode 191*a*. In the illustrated exemplary embodiment, the outer stem 195*b* of the second subpixel electrode 191*b* is formed by the left, right, and upper edges, but is not formed at a lower edge that faces the first subpixel electrode 191*a*.

In the illustrated exemplary embodiment, at least one of the first subpixel electrode 191*a* and the second subpixel electrode 191*b* may not include the outer stem 195*a* or 195*b*. In addition, the detailed structures of the first subpixel electrode 191*a* and the second subpixel electrode 191*b* are merely an example, and may be variously modified.

A second insulating layer 180*b* is disposed on the second subpixel electrode 191*b*. The second insulating layer 180*b* is a layer formed on the pixel electrode 191, but may be disposed only on the second subpixel electrode 191*b*. The second insulating layer 180*b* may not overlap most of the first subpixel electrode 191*a*, but a portion of the first subpixel electrode 191*a* adjacent to the boundary B (e.g., a portion thereof that overlaps a protrusion 181*b*) may overlap the second insulating layer 180*b*. The second insulating layer 180*b* may be continuously positioned over the adjacent pixels PX in the first direction D1. The second insulating layer 180*b* may include an organic insulating material. The second insulating layer 180*b* may be formed of a material that is different from that of the first insulating layer 180*a*, e.g., a material having a good compressive restoring force and elasticity, that is, a same material as a column spacer 85. In this case, the second insulating layer 180*b* and the column spacer 85 may be formed together by forming a transparent insulating layer on the first and second subpixel electrodes 191*a* and 191*b* and patterning it through a photolithography process. Time and cost can be saved since no additional process or additional mask for forming the second insulating layer 180*b* is required. However, the second insulating layer 180*b* may be formed by using a process that is different from that of the column spacer 85, and may be formed of a same material as that of the first insulating layer 180*a*. The second insulating layer 180*b* may include an inorganic insulating material.

A thickness Tb of the second insulating layer 180*b* may be similar or substantially identical to the thickness Ta of the first insulating layer 180*a*. Accordingly, a first cell gap CGa corresponding to a thickness of the liquid crystal layer 3 in the first subpixel sPXa may be similar or substantially identical to a second cell gap CGb corresponding to a thickness of the liquid crystal layer 3 in the second subpixel sPXb. For example, the second cell gap CGb may be about 0.7 to 1.4 times or 0.85 to 1.15 times the first cell gap CGa. The thickness of the second insulating layer 180*b* may be 0.5 μm or more, and when it is smaller, the side viewability may not be improved.

The first insulating layer 180*a* is positioned below the first subpixel electrode 191*a*, the second insulating layer 180*b* is positioned on the second subpixel electrode 191*b*, and the first subpixel electrode 191*a* and the second subpixel electrode 191*b* are formed as a same layer. Accordingly, the second insulating layer 180*b* may be considered to be positioned on the first insulating layer 180*a*.

In the boundary B, the second insulating layer 180*b* may be disposed to overlap the first insulating layer 180*a*. In this case, the protrusion 181*b* which is a portion of the second insulating layer 180*b* which overlaps the first insulating layer 180*a* may convexly protrude more toward the liquid crystal layer 3 than a portion of the second insulating layer 180*b* which overlaps the second subpixel electrode 191*b*. The protrusion 181*b* of the second insulating layer 180*b* may induce the liquid crystal molecules to tilt toward the first subpixel electrode 191*a* or the second subpixel electrode 191*b* in the boundary B, thereby improving liquid crystal controllability in the boundary B and suppressing texture generation. The protrusion 181*b* may also overlap the connector 199. Unlike the illustrated exemplary embodiment, the second insulating layer 180b may not include the protrusion 181b.

Next, the second display panel 200 will be described. A light blocking member 220 called a black matrix is disposed on a second substrate 210 that may be formed of a transparent insulating material such as glass. The light blocking member 220 may serve to prevent light leakage, and may be disposed in the first display panel 100 in another embodiment.

The common electrode 270 is disposed on the light blocking member 220. The common electrode 270 may be formed of a transparent conductive material such as ITO and IZO. The common electrode 270 may be formed as a single plate across the pixels PX or substantially throughout the entire second display panel 200. However, a slit or an opening may be formed in the common electrode 270.

The liquid crystal layer 3 including the liquid crystal molecules 310 is disposed between the first display panel 100 and the second display panel 200. The liquid crystal molecules 310 may have negative dielectric anisotropy, and may be arranged in a direction in which a long axis of the liquid crystal molecules 310 are perpendicular to the electric field. However, the liquid crystal molecules 310 may have positive dielectric anisotropy, and may be arranged in a direction in which the electric field and a long axis of the liquid crystal molecules 310 are parallel. An alignment layer (not illustrated) may be disposed between the first display panel 100 and the liquid crystal layer 3, and between the second display panel 200 and the liquid crystal layer 3. The alignment layer may be a vertical alignment layer.

Figure 6:
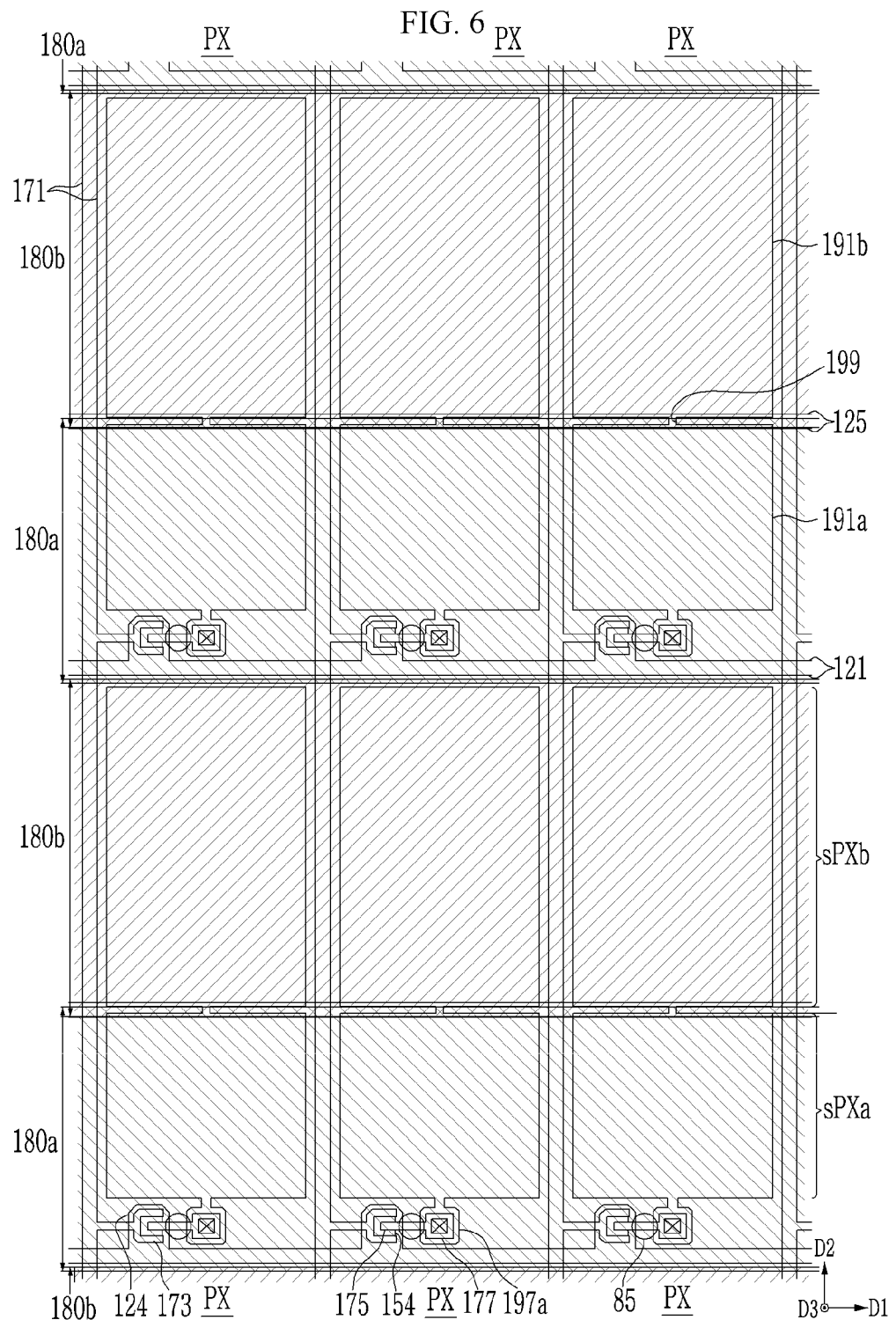
FIG. 6 is a top plan view illustrating six pixels of a liquid crystal display according to an exemplary embodiment.

FIG. 6 is a top plan view illustrating six pixels of a liquid crystal display according to an exemplary embodiment.

In FIG. 6, e.g., six adjacent pixels PX are illustrated among pixels arranged in a matrix. In this region, the first insulating layer 180a and the second insulating layer 180b are indicated by diagonal lines having different directions from each other. A slit or an opening may be formed in the pixel electrode 191, for example, as shown in FIG. 3, but is briefly shown in a substantially rectangular shape.

Referring to FIG. 6, in a planar disposal of the first insulating layer 180a and the second insulating layer 180b, the first insulating layer 180a may be continuously positioned over the adjacent pixels PX, particularly the adjacent first subpixel electrodes 191a in the first direction D1, and the second insulating layer 180b may also be continuously positioned over the adjacent pixels PX, particularly the adjacent second subpixel electrodes 191b. The first insulating layer 180a overlaps the first subpixel electrode 191a, and the second insulating layer 180b overlaps the second subpixel electrode 191b. Accordingly, the first insulating layer 180a and the second insulating layer 180b may discontinuously alternately positioned over the adjacent pixels PX in the second direction D2. Edges of the first insulating layer 180a and the second insulating layer 180b may overlap each other as illustrated therein, but may not overlap each other.

As described above, the first subpixel electrode 191a and the second subpixel electrode 191b are connected with the connector 199 to receive a same voltage. However, a voltage (effective voltage) acting to form an electric field in the liquid crystal layer is reduced by a voltage drop by the second insulating layer 180b disposed on the second subpixel electrode 191b. As a result, an intensity of an electric field formed in the liquid crystal layer 3 of the first subpixel sPXa becomes smaller than an intensity of an electric field formed in the liquid crystal layer 3 of the second subpixel sPXb. In contrast, since there is no insulating layer on the first subpixel electrode 191a, an effective voltage of the first subpixel sPXa may be the same as an applied voltage (data voltage). This voltage drop effect may depend on a dielectric constant and thickness of the second insulating layer 180b. It is seen through a following equation that the voltage drop effect increases as the thickness is thicker and the dielectric constant is smaller.

$$V_{eff} = V_0 \left( 1 + \frac{\frac{d_p}{d_{lc}}}{\frac{\varepsilon_p}{\varepsilon_{lc}}} \right)^{-1}$$

Herein, $V_{eff}$ indicates effective voltage, $V_0$ indicates an applied voltage, $d_p$ indicates a thickness of the insulating layer, $d_{lc}$ indicates a cell gap, $\varepsilon_p$ indicates a dielectric constant of the insulating layer, and $\varepsilon_{lc}$ indicates a dielectric constant of the liquid crystal layer.

The reason why the intensity of the electric field formed in the liquid crystal layer 3 of the first subpixel sPXa will be described in another way. The intensity of the electric field is proportional to the voltage, and is inversely proportional to a distance between the two electrodes. A same voltage is applied to the first subpixel electrode 191a and the second subpixel electrode 191b. However, a distance between the first subpixel electrode 191a and the common electrode 270 substantially corresponds to the first cell gap CGa, and a distance between the second subpixel electrode 191b and the common electrode 270 substantially corresponds to a sum of the second cell gap CGb and the thickness Tb of the second insulating layer 180b. Accordingly, since the distance between the second subpixel electrode 191b and the common electrode 270 is relatively large, an intensity of an electric field generated in the liquid crystal layer 3 of the first subpixel sPXa may be small.

As the intensity of the electric field is larger, the liquid crystal molecules 310 of the liquid crystal layer 3 are more inclined to transmit a larger amount of light. As a result, a transmittance of the first subpixel sPXa is different from that of the of the second subpixel sPXb. When a difference in the transmittances between the first and second subpixels sPXa and sPXb is appropriately adjusted, an image viewed from the side can be controlled to approach an image viewed from the front as closely as possible, thereby improving side visibility.

Only one transistor may be disposed to apply only one data voltage in order to form the first and second subpixels sPXa and sPXb capable of improving the side visibility. Therefore, it is possible to increase an aperture ratio of the liquid crystal display and simplify a driving circuit as compared with a structure for improving the side visibility by disposing a plurality of transistors and applying a plurality of data voltages. In addition, although the intensity of the electric field is differently adjusted by using a voltage drop effect caused by the second insulating layer 180b formed on the second subpixel electrode 191b, a height difference between the second subpixel electrode 191b and the first subpixel electrode 191a may be made to allow the second cell gap CGb to be equal to or more than the first cell gap CGa. Accordingly, it is possible to reduce the transmittance in the second subpixel sPXb.

By cross-referring to FIG. 2, the first subpixel electrode 191a and the common electrode 270 constitute a first liquid crystal capacitor Clc1 together with the liquid crystal layer 3 therebetween, and the second subpixel electrode 191b and the common electrode 270 constitute the second liquid crystal capacitor Clc2 together with the liquid crystal layer 3 therebetween. The first and second liquid crystal capacitors Clc1 and Clc2 maintain the applied voltage even after the transistor Q is turned off. In addition, the first and second subpixel electrodes 191a and 191b overlap the storage electrode line 125 to constitute the first and second storage capacitors Cst1 and Cst2. According to the present exemplary embodiment, a charging voltage of the second liquid crystal capacitor Clc2 may be lower than that of the first liquid crystal capacitor Clc1, and thus it is possible to improve the side visibility of the liquid crystal display by differently adjusting the charging voltages of the first and second liquid crystal capacitors Clc1 and Clc2.

The liquid crystal display according to the exemplary embodiment has been described in detail. Hereinafter, differences in a form of the pixel electrode between the aforementioned exemplary embodiment and some other exemplary embodiments will be mainly described. The same reference numerals are given to the same or similar constituent elements.

Figure 7:
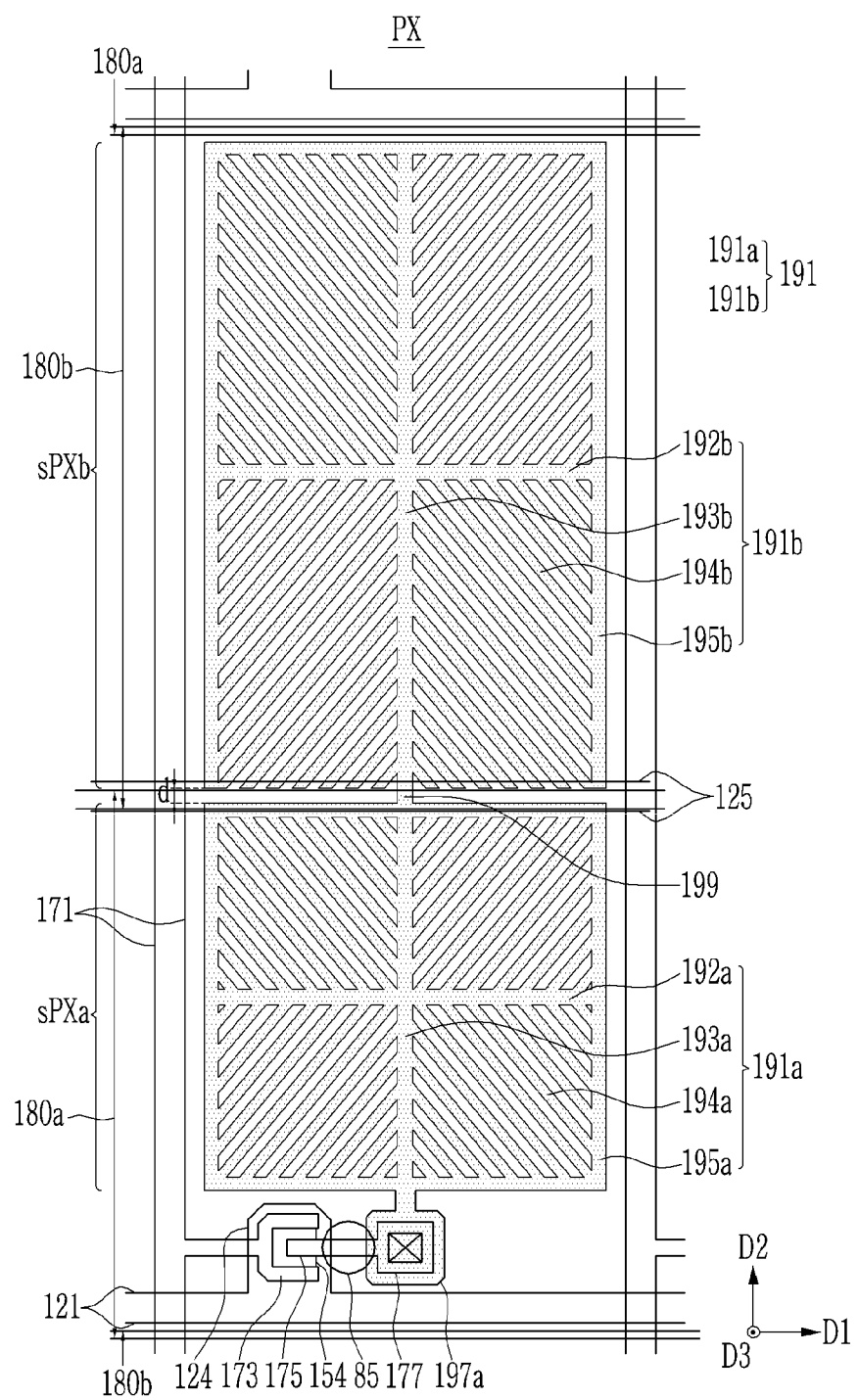
FIG. 7 and FIG. 8 are top plan views illustrating one pixel of a liquid crystal display according to an exemplary embodiment.
Figure 8:
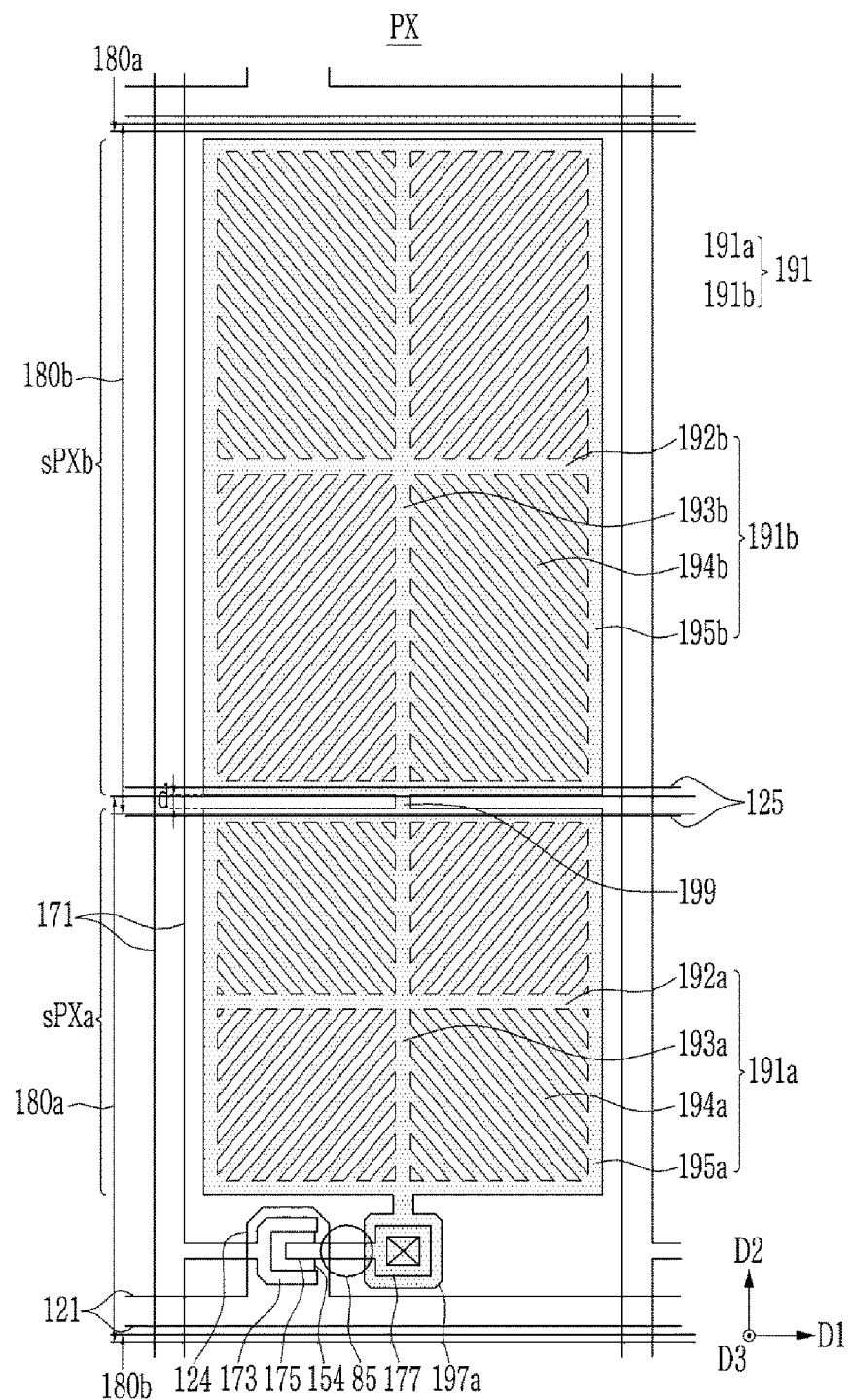

FIG. 7 and FIG. 8 are top plan views illustrating one pixel of a liquid crystal display according to an exemplary embodiment.

Referring to FIG. 7, the pixel electrode 191 includes a first subpixel electrode 191a and a second subpixel electrode 191b. The first subpixel electrode 191a includes a horizontal stem 192a, a vertical stem 193a, branches 194a, and an outer stem 195a, and the second subpixel electrode 191b includes a horizontal stem 192b, a vertical stem 193b, branches 194b, and an outer stem 195b. Similar to the exemplary embodiment of FIG. 3, the outer stem 195b of the second subpixel electrode 191b is formed at left, right, and upper edges, but is not formed at a lower edge that faces the first subpixel electrode 191a.

Unlike the exemplary embodiment of FIG. 3, the outer stem 195a of the first subpixel electrode 191a is formed at all edges including an upper edge as well as the left, right, and lower edges. As a formation region of the outer stem 195a increases, an effective area of the first subpixel electrode 191a may increase, thereby increasing the transmittance. In contrast, it may be disadvantageous in terms of liquid crystal controllability. For example, this is because a direction of a fringe field formed by the branches 194a is different from that of a fringe field formed by the outer stem 195a, and thus a direction in which the liquid crystal molecules are inclined may not be constant. This may cause textures or slow response times.

Therefore, formation of the outer stems 195a and 195b may be designed in consideration of transmittance, liquid crystal controllability, and a distance between the first subpixel electrode 191a and the second subpixel electrode 191b. As described above, the transmittance and the liquid crystal controllability also depend on the distance d between the first subpixel electrode 191a and the second subpixel electrode 191b. The electric field generated in the first subpixel sPXa is larger than that generated in the second subpixel sPXb and the liquid crystal controllability increases as the electric field is larger. Accordingly, it may be advantageous to form the outer stem 195a in the upper edge of the first subpixel electrode 191a as compared with the lower edge of the second subpixel electrode 191b. According to the exemplary embodiment of FIG. 7, the transmittance may be improved by forming the outer stem 195a in the upper edge of the first subpixel electrode 191a, and the liquid crystal controllability may be improved by not forming the outer stem 195b in the lower edge of the second subpixel electrode 191b.

Referring to FIG. 8, although similar to the exemplary embodiment of FIG. 7, the outer stem 195b of the second subpixel electrode 191b is formed in all edges including the lower edge as well as the left, right, and upper edges. As the formation of the outer stem 195b increases, the effective area of the second subpixel electrode 191b may increase, thereby increasing the transmittance. In contrast, it may be advantageous in terms of the liquid crystal controllability as compared with the exemplary embodiment of FIG. 7.

Hereinafter, characteristics of the liquid crystal display according to some exemplary embodiments will be described based on simulation results with reference to FIG. 9 to FIG. 15. Reference numerals for the respective constituent elements refer to the reference numerals illustrated in FIG. 1 to FIG. 7. All simulations were performed while setting the first cell gap CGa of the first subpixel sPXa as 3.2 µm and varying the thickness Tb of the second insulating layer 180b in the second subpixel sPXb.

FIG. 9 to FIG. 15 are graphs illustrating characteristics of liquid crystal displays according to some exemplary embodiments.

Figure 9:
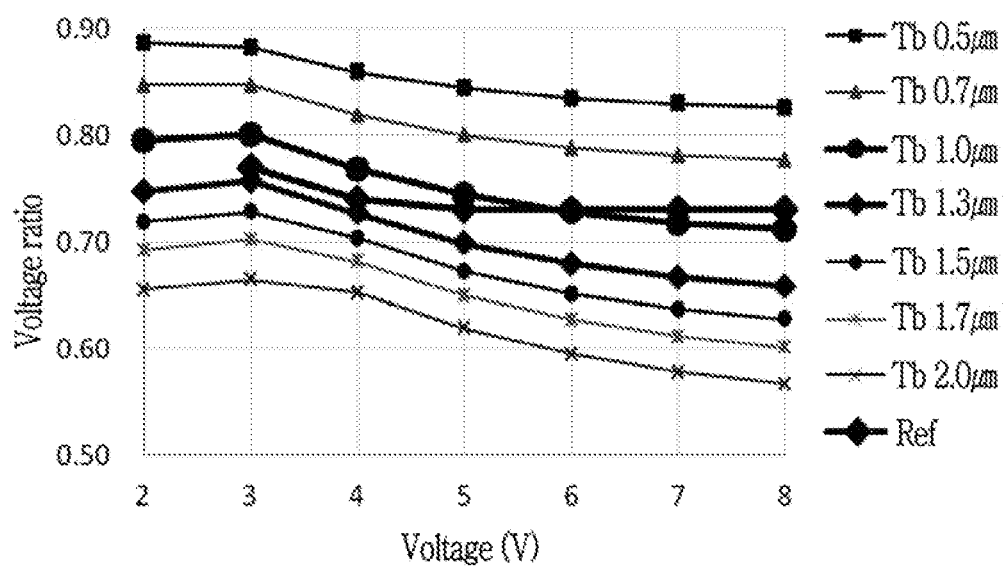
FIGS. 9, 10, 11, 12, 13, 14, and 15 are graphs illustrating characteristics of liquid crystal displays according to some exemplary embodiments.
Figure 10:
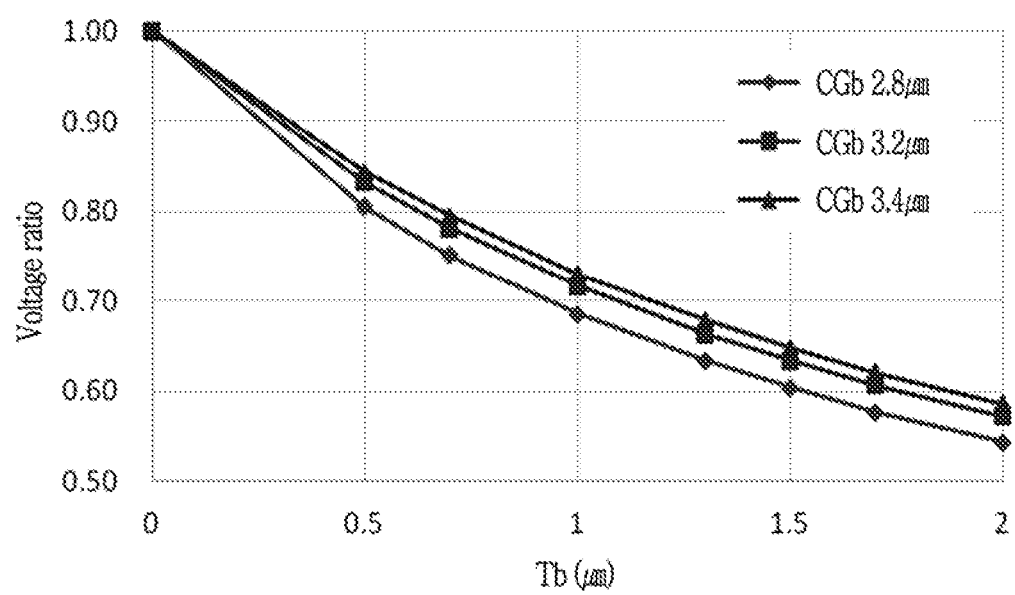

First, FIG. 9 and FIG. 10 illustrate a ratio (hereinafter referred to as a voltage ratio) of an effective voltage of the second subpixel sPXb to an effective voltage of the first subpixel sPXa. Specifically, FIG. 9 illustrates a voltage ratio depending on a driving voltage (data voltage) when the second cell gap CGb is about 3.2 µm, and FIG. 10 illustrates a voltage ratio depending on the second cell gap CGb and the thickness Tb of the second insulating layer 180b.

Referring to FIG. 9, when the thickness Tb of the second insulating layer 180b is about 1.0 µm, a voltage ratio that approaches a reference voltage ratio Ref is obtained. When the thickness Tb of the second insulating layer 180b is 1.3 µm at a lower voltage and is 0.7 µm at a higher voltage, a voltage ratio closer to the reference voltage ratio Ref is obtained. Accordingly, the thickness Tb of the second insulating layer 180b may be advantageously about 0.7 to 1.3 µm or about 1.0 to 1.3 µm. However, since the reference voltage ratio Ref is not absolute, the thickness of the second insulating layer 180b may vary depending on the design. Nevertheless, when the thickness Tb of the second insulating layer 180b is smaller than about 0.5 µm, the voltage ratio may approach 1, and thus it may be difficult to expect side visibility improvement. Referring to FIG. 10, it is seen that as the second cell gap CGb is reduced, the voltage ratio is reduced. Accordingly, it is required to consider both the second cell gap CGb and the thickness Tb of the second insulating layer 180b in order to obtain a predetermined voltage ratio.

Figure 11:
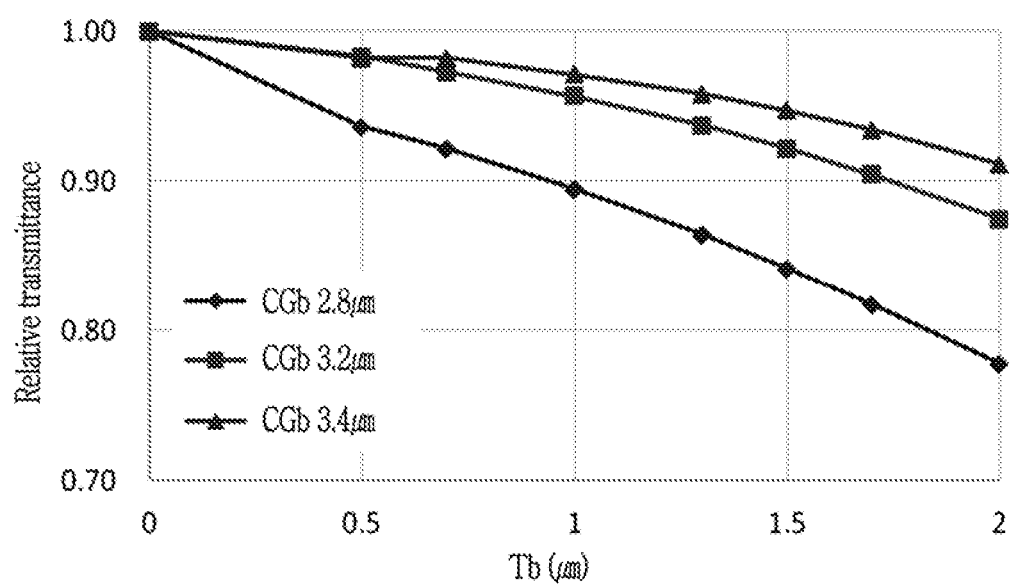
Figure 12:
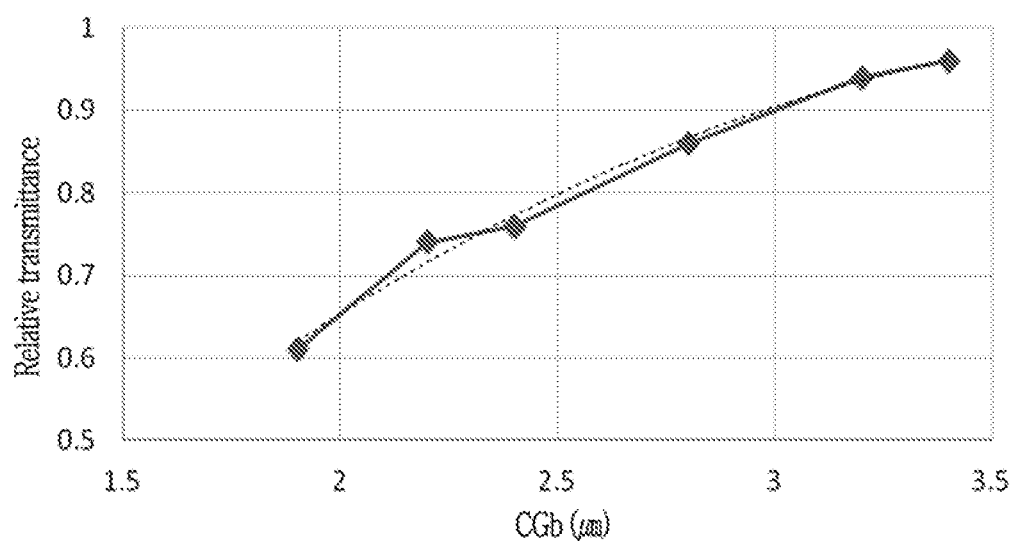

FIG. 11 and FIG. 12 illustrate a transmittance (relative transmittance) of the second subpixel sPXb with respect to the first subpixel sPXa depending on the thickness Tb of the second insulating layer 180b and the second cell gap CGb. An area ratio of the first subpixel sPXa and the second subpixel sPXb was set as 1:1.5. Referring to FIG. 11, when the thickness Tb of the second insulating layer 180b increases, the transmittance is reduced by the voltage drop effect. The reduction of the transmittance more significantly occurs as the second cell gap CGb is smaller. Referring to FIG. 12, as the second cell gap CGb increases, the transmittance increases. Accordingly, it may be advantageous to set the second cell gap CGb to be similar to or greater than the first cell gap CGa in order to obtain predetermined transmittance.

Figure 13:
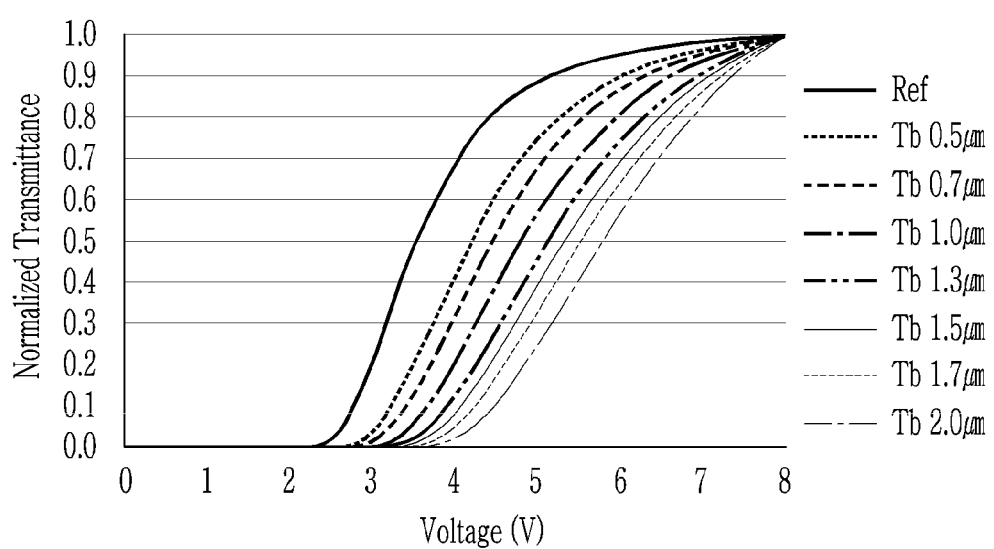

FIG. 13 illustrates a V-T characteristic depending on the thickness Tb of the second insulating layer 180b when the second cell gap CGb 3.2 μm. Referring to FIG. 13, the transmittance is reduced by the voltage drop effect when the thickness Tb of the second insulating layer 180b increases, and thus a V-T curve shifts right. In addition, as a slope of the V-T curve is reduced with the shift of the V-T curve, the V-T curve is formed in a direction favorable for side visibility. This is due to an effect that the voltage ratio decreases as a gray level increases.

Figure 14:
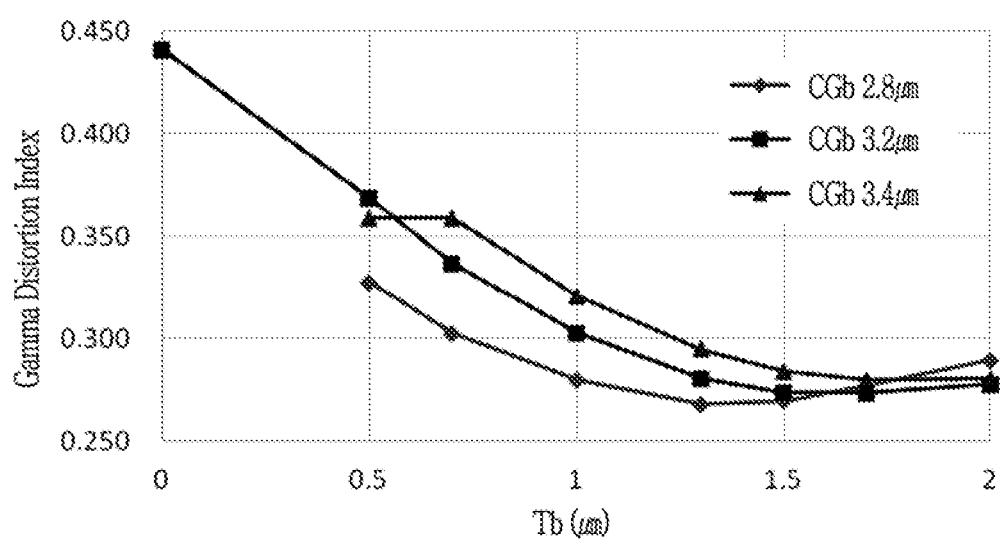
Figure 15:
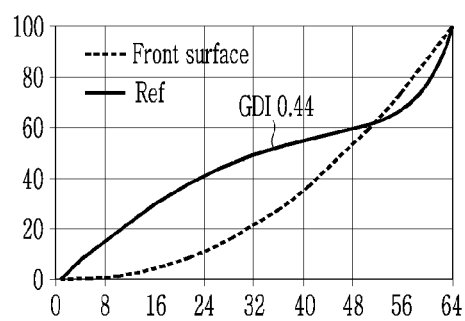
Figure 15:
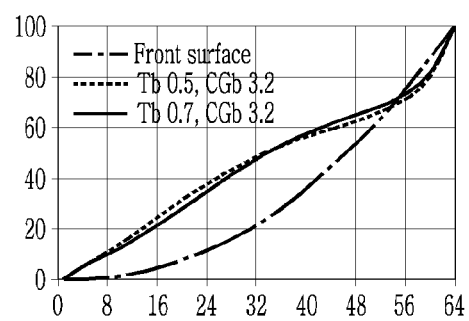
Figure 15:
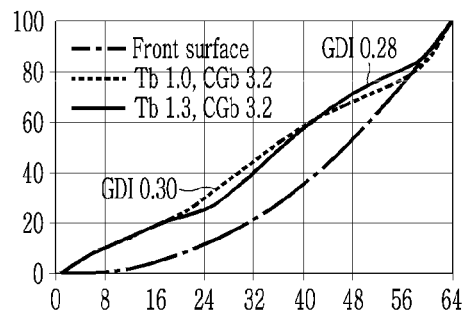
Figure 15:
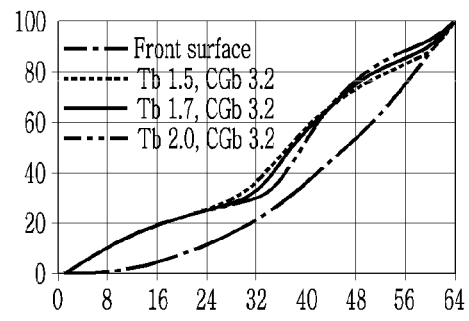
Figure 15:
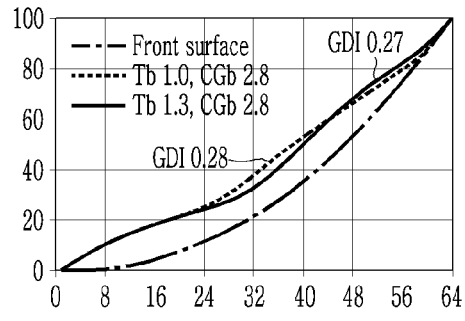
Figure 15:
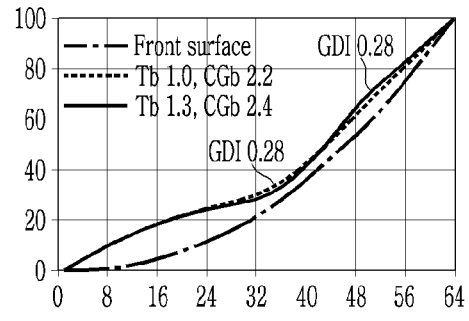

FIG. 14 and FIG. 15 illustrate the side visibility characteristic depending on the thickness Tb of the second insulating layer 180b. The side visibility may be evaluated by a gamma distortion index (GDI) based on a gamma curve when the pixels PX is viewed from a side at 60°. A curve of FIG. 14 shows the side visibility is improved when the thickness Tb of the second insulating layer 180b is 0.5 μm or more. In addition, when the thickness Tb of the second insulating layer 180b is 1 μm or more, it is possible to obtain side visibility equivalent to that of a structure that improves the side visibility by a voltage dividing effect by using two additional transistors and the reference voltage. However, the GDI increases again when the thickness (Tb) increases to some extent.

In FIG. 15 illustrating six curves, a horizontal axis indicates gray, and a vertical axis is a gamma curve showing luminance (%). In a first curve of FIG. 15, Ref indicates a gamma curve when the thickness Tb of the second insulating layer 180b is 0. It is seen through the other curves of FIG. 15 that the side visibility is improved (approaching a front gamma curve) as the thickness Tb of the second insulating layer 180b increases. The side visibility may be further improved when the second cell gap CGb is 3.3 μm as compared with 2.8 μm or less. However, the loss of the transmittance may increase instead.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
   a substrate;
   a pixel electrode disposed on the substrate and including a first subpixel electrode and a second subpixel electrode;
   a liquid crystal layer disposed on the first subpixel electrode and the second subpixel electrode;
   a first insulating layer disposed between the substrate and the first subpixel electrode;
   a connector disposed between and directly connecting the first subpixel electrode and the second subpixel electrode, extending along a side surface of the first insulating layer, and inclined to a thickness direction of the first insulating layer;
   a second insulating layer disposed between the second subpixel electrode and the liquid crystal layer and covering the connector; and
   a common electrode disposed on the liquid crystal layer,
   wherein the first subpixel electrode and the second subpixel electrode are integral, and are disposed as a same layer,
   wherein a distance between the first subpixel electrode and the common electrode is smaller than a distance between the second subpixel electrode and the common electrode, and
   wherein the second insulating layer covers an entirety of the second subpixel electrode and does not overlap a center of the first subpixel electrode, wherein the second insulating layer includes an overlapping portion that overlaps the first insulating layer and a non-overlapping portion that does not overlap the first insulating layer, and
   the overlapping portion of the second insulating layer protrudes more toward the liquid crystal layer than the non-overlapping portion.

2. The liquid crystal display of claim 1, wherein the first subpixel electrode and the second subpixel electrode do not overlap each other.

3. The liquid crystal display of claim 1, wherein the first subpixel electrode and the second subpixel electrode have facing end portions which are connected with each other.

4. The liquid crystal display of claim 3, wherein the first subpixel electrode and the second subpixel electrode are connected with the connector integral therewith.

5. The liquid crystal display of claim 1, wherein the first insulating layer and the second insulating layer are different materials.

6. The liquid crystal display of claim 5, further comprising a column spacer disposed on the first insulating layer,
   wherein the second insulating layer is a same material as that of the column spacer.

7. The liquid crystal display of claim 1, wherein a cell gap of a liquid crystal layer overlapping the second subpixel electrode is 0.85 to 1.15 times a cell gap of a liquid crystal layer overlapping the first subpixel electrode.

8. The liquid crystal display of claim 1, wherein a thickness of the second insulating layer is about 0.5 μm or more.

9. The liquid crystal display of claim 1, wherein the second insulating layer includes a protrusion that overlaps the first insulating layer and protrudes toward the liquid crystal layer.

10. A liquid crystal display comprising:
    a substrate;
    a pixel electrode disposed on the substrate and including a first subpixel electrode and a second subpixel electrode;
    a liquid crystal layer disposed on the first subpixel electrode and the second subpixel electrode;
    a first insulating layer disposed between the substrate and the first subpixel electrode;
    a second insulating layer disposed between the second subpixel electrode and the liquid crystal layer; and
    a common electrode disposed on the liquid crystal layer,
    wherein the first subpixel electrode is disposed farther from the substrate than the second subpixel electrode, and the first subpixel electrode and the second subpixel electrode have facing edges which are connected with each other, wherein the first insulating layer is continuously positioned over a plurality of first subpixel electrodes in a first direction, and the second insulating layer is continuously positioned over a plurality of second subpixel electrodes in the first direction,
    wherein the first insulating layer and the second insulating layer are alternately disposed in a second direction that crosses the first direction, wherein the second insulating layer includes an overlapping portion that overlaps the first insulating layer and a non-overlapping portion that does not overlap the first insulating layer, and the overlapping portion of the second insulating layer protrudes more toward the liquid crystal layer than the non-overlapping portion.

11. The liquid crystal display of claim 10, wherein the first subpixel electrode and the second subpixel electrode are connected with a connector integral therewith.

12. The liquid crystal display of claim 11, wherein the connector extends along a side surface of the first insulating layer.

13. The liquid crystal display of claim 12, wherein each of the first subpixel electrode and the second subpixel electrode includes a horizontal stem, a vertical stem that crosses the horizontal stem, and branches that extend from the horizontal stem and vertical stem in a diagonal direction, and the connector is connected with the vertical stem of the first subpixel electrode and the vertical stem of the second subpixel electrode.

14. The liquid crystal display of claim 13, wherein each of the first subpixel electrode and the second subpixel electrode includes an outer stem disposed in at least one edge thereof.

15. The liquid crystal display of claim 14, wherein the outer stem is not disposed in at least one of facing edges of the first subpixel electrode and the second subpixel electrode.

16. The liquid crystal display of claim 11, wherein the overlapping portion of the second insulating layer overlaps the connector.

17. The liquid crystal display of claim 10, further comprising a transistor disposed between the substrate and the pixel electrode, wherein the first subpixel electrode is directly connected with the transistor by an extension, and the second subpixel electrode is electrically connected to the transistor through the first subpixel electrode.

18. The liquid crystal display of claim 10, wherein an edge of the first insulating layer overlaps an edge of the second insulating layer.

\* \* \* \* \*